United States Patent
Matsubara et al.

(10) Patent No.: US 11,597,377 B2
(45) Date of Patent: Mar. 7, 2023

(54) CONTROL APPARATUS FOR VEHICLE

(71) Applicants: TOYOTA JIDOSHA KABUSHIKI KAISHA, Toyota (JP); AISIN CORPORATION, Kariya (JP)

(72) Inventors: Keigo Matsubara, Nagoya (JP); Masayuki Baba, Toyota (JP); Tomoya Inayoshi, Kariya (JP); Takuma Sugino, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 17/841,919

(22) Filed: Jun. 16, 2022

(65) Prior Publication Data
US 2022/0402480 A1 Dec. 22, 2022

(30) Foreign Application Priority Data
Jun. 22, 2021 (JP) ............................ JP2021-103587

(51) Int. Cl.
*B60W 20/40* (2016.01)
*B60W 10/06* (2006.01)
(Continued)

(52) U.S. Cl.
CPC ............ *B60W 20/40* (2013.01); *B60W 10/02* (2013.01); *B60W 10/06* (2013.01); *B60W 30/19* (2013.01);
(Continued)

(58) Field of Classification Search
CPC ...... B60W 20/40; B60W 10/02; B60W 10/06; B60W 30/19; B60W 2510/025;
(Continued)

(56) References Cited

U.S. PATENT DOCUMENTS

2013/0297135 A1* 11/2013 Yamanaka ............. B60W 10/11
180/65.265
2014/0222269 A1* 8/2014 Tsutsumi ............... B60W 20/40
180/65.265
(Continued)

FOREIGN PATENT DOCUMENTS

DE 102016100906 A1 * 7/2016 ............. B60K 6/387
JP 2021-054165 A 4/2021
WO WO-2012095970 A1 * 7/2012 ............... B60K 6/48

*Primary Examiner* — Richard W Ridley
*Assistant Examiner* — Aimee Tran Nguyen
(74) *Attorney, Agent, or Firm* — Sughrue Mion, PLLC (57) ABSTRACT

A vehicle control apparatus includes an overlapping-prediction determination portion configured to determine whether or not it is predicted that, during execution of a synchronous control for placing a clutch, which is provided between an engine and an electric motor, into an engaged state, a synchronization-completion time point of the clutch overlaps with an inertia phase period in process of a shift control of a transmission, and a torque limitation portion configured, when the overlapping-prediction determination portion determines that it is predicted that the synchronization-completion time point overlaps with the inertia phase period, to execute a torque limitation by which at least one of a torque capacity of the clutch and an output torque of the engine is made smaller than when the overlapping-prediction determination portion determines that it is not predicted that the synchronization-completion time point overlaps with the inertia phase period.

7 Claims, 3 Drawing Sheets

(51) Int. Cl.
*B60W 30/19* (2012.01)
*B60W 10/02* (2006.01)

(52) U.S. Cl.
CPC ............... *B60W 2510/025* (2013.01); *B60W 2510/1005* (2013.01); *B60W 2710/027* (2013.01); *B60W 2710/0666* (2013.01)

(58) Field of Classification Search
CPC ... B60W 2510/1005; B60W 2710/027; B60W 2710/0666; B60W 20/30; B60W 2510/0216; B60W 2510/0241; B60W 2510/1095; B60W 2710/026
See application file for complete search history.

(56) References Cited

U.S. PATENT DOCUMENTS

| | | | |
|---|---|---|---|
| 2017/0120896 A1* | 5/2017 | Thompson | ............... B60K 6/48 |
| 2021/0129830 A1 | 5/2021 | Matsubara et al. | |

* cited by examiner

CONTROL APPARATUS FOR VEHICLE

This application claims priority from Japanese Patent Application No. 2021-103587 filed on Jun. 22, 2021, the disclosure of which is herein incorporated by reference in its entirety.

FIELD OF THE INVENTION

The present invention relates to a control apparatus for a vehicle that includes an engine, drive wheels, an electric motor, a clutch provided between the engine and the electric motor and a transmission provided between the electric motor and the drive wheels.

BACKGROUND OF THE INVENTION

There is well known a control apparatus for a vehicle that includes: (a) an engine; (b) drive wheels; (c) an electric motor connected, in a power transmittable manner, to a power transmission path between the engine and the drive wheels; (d) a clutch provided between the engine and the electric motor in the power transmission path; and (e) a transmission provided between the electric motor and the drive wheels. A hybrid-vehicle control apparatus disclosed in JP 2021-54165 A is an example of such a control apparatus. This Japanese Patent Application Publication discloses that, upon satisfaction of a condition required for starting the engine, the engine is started by controlling the clutch and electric motor such that the clutch is slipped and the electric motor outputs a cranking torque.

SUMMARY OF THE INVENTION

By the way, there is a case in which starting of the engine and a shifting action of the transmission are executed concurrently with each other, namely, executed in overlap with each other. In this case, a rotational speed of an output member of the clutch could be fluctuated by fluctuation of a rotational speed of an input member of the transmission in process of the shifting action of the transmission. The fluctuation of the rotational speed of the output member of the clutch makes it difficult to appropriately execute a synchronous control for placing the clutch into its engaged state upon the starting of the engine, thereby causing a risk of occurrence of a shock. Further, in this case, an input torque of the transmission could be fluctuated by placement of the clutch into the engaged state, so that the shifting action of the transmission could not be appropriately executed whereby a risk of occurrence of a shock is caused. It might be possible to avoid overlapping of the starting of the engine and the shifting action of the transmission, so as to suppress the shock, by delaying one of the engine starting and the transmission shifting action relative to the other. However, in this arrangement, it would take a long time to complete the starting of the engine and the shifting action of the transmission, thereby causing a risk of reduction of an acceleration responsiveness.

The present invention was made in view of the background art described above. It is therefore an object of the present invention to provide a vehicle control apparatus capable of suppressing occurrence of a shock and also suppressing reduction of an acceleration responsiveness when an engine starting and a transmission shifting action are executed in overlap with each other.

The object indicated above is achieved according to the following aspects of the present invention.

According to a first aspect of the invention, there is provided a control apparatus for a vehicle that includes: (a) an engine; (b) drive wheels; (c) an electric motor connected, in a power transmittable manner, to a power transmission path between the engine and the drive wheels; (d) a clutch provided between the engine and the electric motor in the power transmission path; and (e) a transmission provided between the electric motor and the drive wheels, the control apparatus comprising: a clutch control portion configured, upon starting of the engine, to execute a synchronous control for switching an operation state of the clutch from a released state to an engaged state, by increasing a torque capacity of the clutch such that synchronization of an input rotational speed and an output rotational speed of the clutch is completed; an engine control portion configured, upon the starting of the engine, to increase an output torque of the engine; a transmission control portion configured to execute a shift control of the transmission; an overlapping-prediction determination portion configured to determine whether or not it is predicted that, during execution of the synchronous control, a synchronization-completion time point of the clutch overlaps with an inertia phase period from a start to an end of an inertia phase in process of the shift control; and a torque limitation portion configured, when the overlapping-prediction determination portion determines that it is predicted that the synchronization-completion time point overlaps with the inertia phase period, to execute a torque limitation by which at least one of the torque capacity of the clutch and the output torque of the engine is made smaller than when the overlapping-prediction determination portion determines that it is not predicted that the synchronization-completion time point overlaps with the inertia phase period.

According to a second aspect of the invention, in the control apparatus according to the first aspect of the invention, the overlapping-prediction determination portion is configured to determine whether or not it is predicted that the synchronization-completion time point does not overlaps with the inertia phase period, during execution of the torque limitation, wherein the torque limitation portion is configured to release the torque limitation, when the overlapping-prediction determination portion determines that it is predicted that the synchronization-completion time point does not overlaps with the inertia phase period.

According to a third aspect of the invention, in the control apparatus according to the second aspect of the invention, the overlapping-prediction determination portion is configured to determine that it is predicted that the synchronization-completion time point does not overlaps with the inertia phase period, when the shift control is terminated or when the synchronous control is terminated.

According to a fourth aspect of the invention, in the control apparatus according to any one of the first through third aspects of the invention, the torque limitation portion is configured, when executing the torque limitation, to limit each of the at least one of the torque capacity of the clutch and the output torque of the engine, to a limited value that is dependent on at least one of a kind of the shift control and a method of starting the engine.

According to a fifth aspect of the invention, in the control apparatus according to any one of the first through fourth aspects of the invention, the torque limitation portion is configured to release the torque limitation, when a predetermined time, which is predetermined for suppressing reduction of an acceleration responsiveness, elapses from starting of the torque limitation.

According to a sixth aspect of the invention, in the control apparatus according to any one of the first through fifth aspects of the invention, the inertia phase period includes at least a vicinity of a start point and a vicinity of an end point of the inertia phase, such that the vicinity of the start point of the inertia phase includes the start point of the inertial phase, and the vicinity of the end point of the inertia phase includes the end point of the inertial phase.

According to a seventh aspect of the invention, in the control apparatus according to any one of the first through sixth aspects of the invention, the overlapping-prediction determination portion is configured to determine whether or not it is predicted that the synchronization-completion time point overlaps with the inertia phase period, depending on (i) a synchronization time point of the clutch estimated based on a rate of change of a difference between the input rotational speed and the output rotational speed of the clutch and (ii) the inertia phase period estimated based on a degree of progress of the shift control.

In the control apparatus according to the first aspect of the invention, when the overlapping-prediction determination portion determines that it is predicted that the synchronization-completion time point overlaps with the inertia phase period, during execution of the synchronous control upon the starting of the engine, the torque limitation portion executes the torque limitation by which at least one of the torque capacity of the clutch and the output torque of the engine is made smaller than when the overlapping-prediction determination portion determines that it is not predicted that the synchronization-completion time point overlaps with the inertia phase period. Owing to this arrangement, it is possible to delay the synchronization-completion time point of the clutch relative to the inertia phase period and to suppress fluctuation of an input torque of the transmission upon switching of the clutch to the engaged state in the inertia phase period. Further, the determination as to whether or not it is predicted that the synchronization-completion time point of the clutch overlaps with the inertia phase period is made shortly before the synchronization-completion time point, so that it is possible to reduce a time required to complete the starting of the engine and a shifting action of the transmission, as compared with an arrangement in which the starting of the engine is delayed as soon as the starting of the engine and the shifting action of the transmission start to be executed in overlap with each other. Further, when it is determined that it is predicted that the synchronization-completion time point of the clutch does not overlap with the inertia phase period in a situation in which the shock is hardly caused, the starting of the engine and the shifting action of the transmission are executed in overlap with each other without the torque limitation being executed. Therefore, it is possible to suppress occurrence of the shock and also suppress reduction of the acceleration responsiveness when the starting of the engine and the shifting action of the transmission are executed in overlap with each other.

In the control apparatus according to the second aspect of the invention, when the overlapping-prediction determination portion determines that it is predicted that the synchronization-completion time point does not overlap with the inertia phase period, the torque limitation portion releases the torque limitation. Therefore, in the situation in which the shock is hardly caused, each of the at least one of the torque capacity of the clutch and the output torque of the engine is quickly returned to a normal value whereby the reduction of the acceleration responsiveness can be appropriately suppressed.

In the control apparatus according to the third aspect of the invention, the overlapping-prediction determination por-tion determines that it is predicted that the synchronization-completion time point does not overlap with the inertia phase period, when the shift control is terminated or when the synchronous control is terminated. Thus, the torque limitation is appropriately released.

In the control apparatus according to the fourth aspect of the invention, the limited value, to which each of the at least one of the torque capacity of the clutch and the output torque of the engine is to be limited in execution of the torque limitation, is determined depending on at least one of the kind of the shift control and the method of starting the engine. Therefore, it is possible to appropriately delay the synchronization-completion time point of the clutch relative to the inertia phase period and to suppress fluctuation of the input torque of the transmission upon the switching of the clutch to the engaged state in the inertia phase period.

In the control apparatus according to the fifth aspect of the invention, the torque limitation portion is configured to release the torque limitation, when the predetermined time, which is predetermined for suppressing reduction of the acceleration responsiveness, elapses from the starting of the torque limitation. Thus, the reduction of the acceleration responsiveness can be appropriately suppressed.

In the control apparatus according to the sixth aspect of the invention, the inertia phase period includes at least the vicinity of the start point and the vicinity of the end point of the inertia phase, such that the vicinity of the start point of the inertia phase includes the start point of the inertia phase, and the vicinity of the end point of the inertia phase includes the end point of the inertia phase. Thus, when it is determined that it is predicted that synchronization-completion time point of the clutch overlaps with the inertia phase period, it is possible to delay the synchronization-completion time point relative to a period in which the shock is likely to be caused by overlap of the synchronization-completion time point, and to suppress fluctuation of the input torque of the transmission upon the switching of the clutch to the engaged state in the period in which the shock is likely to be caused by overlap of the synchronization-completion time point.

In the control apparatus according to the seventh aspect of the invention, the overlapping-prediction determination portion determines whether or not it is predicted that the synchronization-completion time point overlaps with the inertia phase period, depending on (i) the synchronization time point of the clutch estimated based on the rate of change of a difference between the input rotational speed and the output rotational speed of the clutch and (ii) the inertia phase period estimated based on the degree of progress of the shift control. This arrangement makes it possible to appropriately make the determination as to whether or not it is predicted that the synchronization-completion time point overlaps with the inertia phase period, shortly before the synchronization-completion time point, whereby the period of execution of the torque limitation can be reduced.

DETAILED DESCRIPTION OF PREFERRED EMBODIMENT

Hereinafter, there will be described preferred embodiment in detail with reference to the accompanying drawings.

EMBODIMENT

Figure 1:
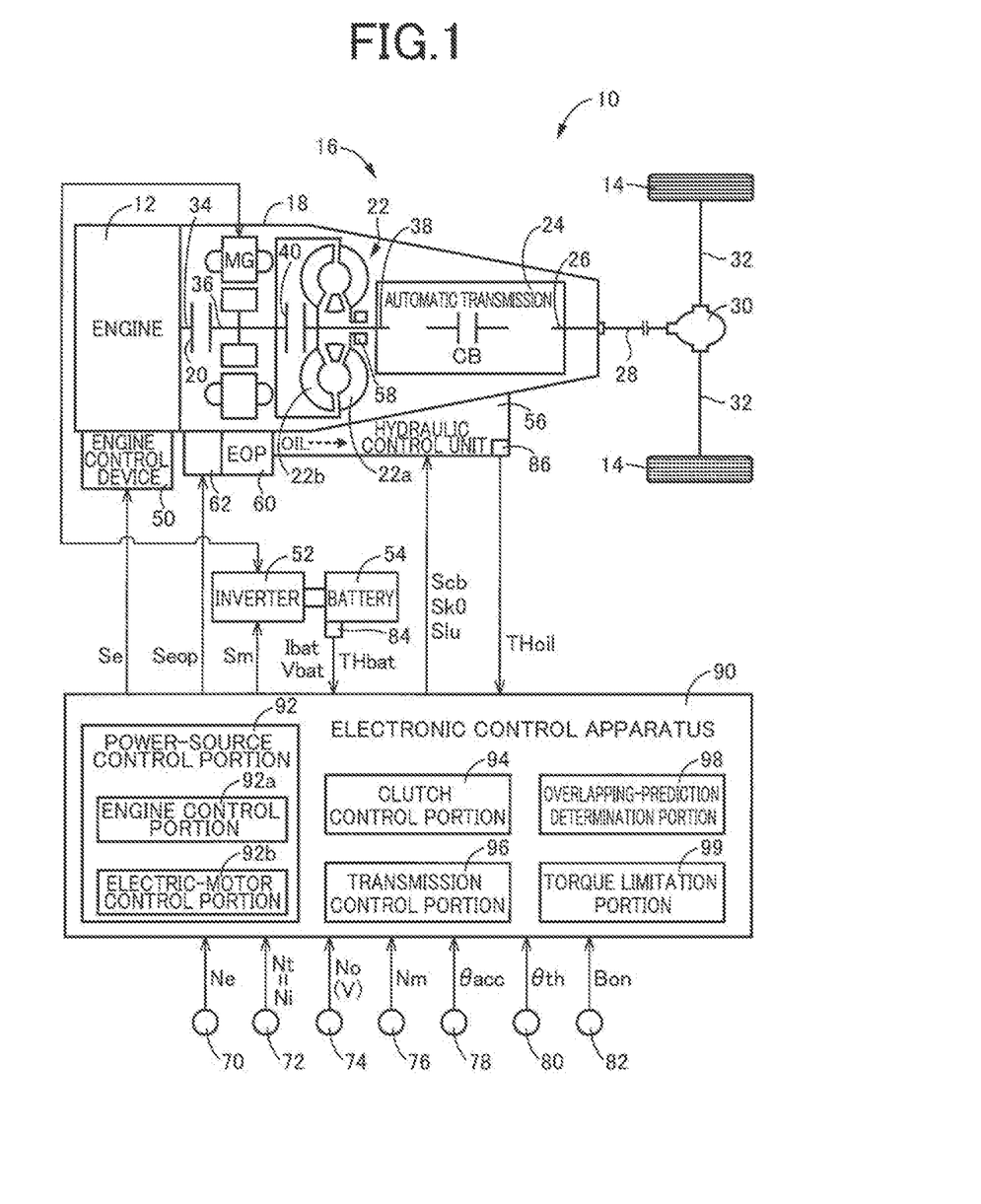
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including an engine 12 and an electric MG that serve as a power source SP. The vehicle 10 further includes drive wheels 14 and a power transmission apparatus 16 that is provided in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The battery 54 is an electric storage device to and from which the electric power is supplied from and to the electric motor MG The inverter 52 is controlled by the electronic control apparatus 90 whereby an MG torque Tm as an output torque of the electric motor MG is controlled. The MG torque Tm serves as a power driving torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. Specifically, the electric motor MG receives the electric power from the battery 54, and generates the power. Further, the electric motor MG generates the electric power based on the power of the engine 12 or a driven power transmitted from the drive wheels 14. The battery 54 is charged with the electric power generated by the electric motor MG The electric power corresponds to an electric energy unless they are to be distinguished from each other. The power corresponds to a drive power, a torque or a force unless they are to be distinguished from each other.

The power transmission apparatus 16 includes a casing 18 as a non-rotary member that is attached to a body of the vehicle 10, a K0 clutch 20 provided between the engine 12 and the electric motor MG in the power transmission path between the engine 12 and the drive wheels 14, a torque converter 22 connected to the engine 12 through the K0 clutch 20, and an automatic transmission 24 connected to the torque converter 22. The K0 clutch 20, electric motor MG, torque converter 22 and automatic transmission 24 are disposed inside the casing 18. The torque converter 22 and the automatic transmission 24 constitute respective parts of the power transmission path between the engine 12 and the drive wheels 14. The automatic transmission 24 is disposed in a power transmission path between the torque converter 22 and the drive wheels 14. The automatic transmission 24 is provided between the electric motor MG and the drive wheels 14 in the power transmission path between the engine 12 and the drive wheels 14. The power transmission apparatus 16 further includes a propeller shaft 28 connected to a transmission output shaft 26 that is an output rotary member of the automatic transmission 24, a differential gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20, and an electric-motor connection shaft 36 connecting between the K0 clutch 20 and the torque converter 22.

The electric motor MG is connected to the electric-motor connection shaft 36 in a power transmittable manner in the casing 18. The electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the K0 clutch 20 and the torque converter 22, so as to be connected to the K0 clutch 20 and the torque converter 22 in a power transmittable manner. That is, the electric motor MG is connected to the torque converter 22 and the automatic transmission 24 without via the K0 clutch 20, in a power transmittable manner.

The torque converter 22 includes a pump impeller 22a connected to the electric-motor connection shaft 36, and a turbine impeller 22b connected to a transmission input shaft 38 that is an input rotary member of the automatic transmission 24. The torque converter 22 is a fluid transmission device, and is configured to transmit the power of the power source SP from the electric-motor connection shaft 36 to the transmission input shaft 38, through a fluid circulating in the torque converter 22. The torque converter 22 includes a direct clutch in the form of an LU clutch 40 configured to connect between the pump impeller 22a and the turbine impeller 22b, i.e., between the electric-motor connection shaft 36 and the transmission input shaft 38. The LU clutch 40 is a known lockup clutch.

The LU clutch 40 is configured to receive an LU hydraulic pressure PRlu that is a regulated hydraulic pressure supplied from a hydraulic control unit (hydraulic control circuit) 56 provided in the vehicle 10, whereby an LU torque Tlu, i.e., torque capacity of the LU clutch 40 is changed and its controlled or operation state is switched. As the operation state of the LU clutch 40, there are a released state in which the LU clutch 40 is released, a slipped state in which the LU clutch 40 is engaged with slipping, and an engaged state in which the LU clutch 40 is engaged. When the LU clutch 40 is placed in the released state, the torque converter 22 is placed in a torque converter state in which a torque boosting effect is obtained. When the LU clutch 40 is placed in the engaged state, the torque converter 22 is placed in a lockup state in which the pump impeller 22a and the turbine impeller 22b are rotated integrally with each other.

The automatic transmission 24 is a known automatic transmission of a planetary gear type which includes at least one planetary gear device and a plurality of engagement devices CB. Each of the engagement devices CB is, for example, a hydraulically-operated frictional engagement device, and is configured to receive a CB hydraulic pressure PRcb that is a regulated hydraulic pressure supplied from the hydraulic control unit 56, whereby a CB torque Tcb, i.e., torque capacity of the engagement device CB is changed and its controlled or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 24 is configured to switch from one of the gear positions to another one of the gear positions, namely, to establish one of the gear positions which is selected, by the electronic control apparatus 90, depending on, for example, an accelerating operation made by a vehicle driver (operator) and a running speed V of the vehicle 10. The AT input rotational speed Ni is a rotational speed of the transmission input shaft 38, and is an input rotational speed of the automatic transmission 24. The AT input rotational speed Ni is equal to a turbine rotational speed Nt that is an output rotational speed of the torque converter 22. Therefore, the AT input rotational speed Ni can be represented by the turbine rotational speed Nt. The AT output rotational speed No is a rotational speed of the transmission output shaft 26, and is an output rotational speed of the automatic transmission 24.

The K0 clutch 20 is a hydraulically-operated frictional engagement device constituted by a multiple-disc type or single-disc type clutch, for example. A controlled or operation state of the K0 clutch 20 is to be switched among an engaged state, a slipping state and a released state, with a K0 torque Tk0 (that corresponds to a torque capacity of the K0 clutch 20) being changed by a K0 hydraulic pressure PRk0 that is regulated and supplied by the hydraulic control unit 56.

In the vehicle 10, when the K0 clutch 20 is in the engaged state, the engine 12 and the torque converter 22 are connected to each other in a power transmittable manner. When the K0 clutch 20 is in the released state, a power transmission between the engine 12 and the torque converter 22 is cut off. Since the electric motor MG is connected to the torque converter 22, the K0 clutch 20 serves as a clutch configured to connect and disconnect between the engine 12 and the electric motor MG.

In the power transmission apparatus 16, the power outputted from the engine 12 is transmitted, when the K0 clutch 20 is engaged, to the drive wheels 14 from the engine connection shaft 34 through sequentially the K0 clutch 20, electric-motor connection shaft 36, torque converter 22, automatic transmission 24, propeller shaft 28, differential gear device 30 and drive shafts 32, for example. Further, the power transmitted from the electric motor MG is transmitted, irrespective of the operation state of the K0 clutch 20, to the drive wheels 14 from the electric-motor connection shaft 36 through sequentially the torque converter 22, automatic transmission 24, propeller shaft 28, differential gear device 30 and drive shafts 32, for example.

The vehicle 10 further includes an MOP 58 that is a mechanically-operated oil pump, an EOP 60 that is an electrically-operated oil pump, and a pump motor 62. The MOP 58 is connected to the pump impeller 22a, and is to be rotated and driven by the power source SP, so as to output a working fluid OIL that is to be used in the power transmission apparatus 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure, supplies regulated hydraulic pressures that serve as the LU hydraulic pressure PRlu, the CB hydraulic pressure PRcb and the K0 hydraulic pressure PRk0, for example.

The vehicle 10 is provided with the electronic control apparatus 90 including a control apparatus for the vehicle 10. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of a MG speed sensor 76 indicative of the motor rotational speed Nm; an output signal of an accelerator-opening degree sensor 78 indicative of an accelerator opening degree (accelerator operation degree) θacc representing an amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; and an output signal of a fluid temperature sensor 86 indicative of a working-fluid temperature THoil that is a temperature of the working fluid OIL in the hydraulic control unit 56.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal SLU that is to be supplied to the hydraulic control unit 56 for controlling the operation state of the LU clutch 40; and an EOP control command signal Seop that is to be supplied to the pump motor 62 for controlling the EOP 60.

The CB hydraulic command signal Scb represents a CB hydraulic command value Spcb that is a hydraulic-pressure command value by which the regulated CB hydraulic pressure PRcb is to be supplied from the hydraulic control unit 56. The K0 hydraulic command signal Sk0 represents a K0 hydraulic command value Spk0 that is a hydraulic-pressure command value by which the regulated K0 hydraulic pressure PRk0 is to be supplied from the hydraulic control unit 56. The LU hydraulic command signal Slu represents an LU hydraulic command value Splu that is a hydraulic-pressure command value by which the regulated LU hydraulic pressure PRlu is to be supplied from the hydraulic control unit 56.

For performing various control operations in the vehicle 10, the electronic control apparatus 90 includes a power-source control means in the form of a power-source control portion 92, a clutch control means in the form of a clutch control portion 94, and a transmission control means in the form of a transmission control portion 96.

The power-source control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52. The engine control portion 92a and the electric-motor control portion 92b cooperate with each other to constitute a hybrid control means in the form of a hybrid control portion for executing a hybrid-drive control operation, for example, using the engine 12 and the electric motor MG through these control functions.

The power-source control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. From another point of view, the requested drive torque Trdem [Nm] is a requested drive power Proem [W] at the current vehicle running speed V. As the requested drive amount, another value such as a requested drive force Frdem [N] of the drive wheels 14 and a requested AT output torque of the transmission output shaft 26 may be used, too. In the calculation of the requested drive amount, it is also possible to use, for example, the AT output rotational speed No in place of the vehicle running speed V. The power-source control portion 92 outputs the engine control command signal Se and the MG control command signal Sm for controlling the engine 12 and the electric motor MG, respectively, such that the requested drive power Prdem is realized, by taking account of various factors such as a transmission loss, an auxiliary load and the gear ratio γat of the automatic transmission 24.

When the requested drive torque Trdem can be covered by only the output of the electric motor MG, the power-source control portion 92 establishes a BEV driving mode as a driving mode for driving the vehicle 10. When the BEV driving mode is established, the power-source control portion 92 causes the vehicle 10 to perform a motor running (=BEV running) with the K0 clutch 20 being released and with only the electric motor MG serving as the power source SP. On the other hand, when the requested drive torque Trdem cannot be covered without at least the output of the engine 12, the power-source control portion 92 establishes another driving mode that is an engine driving mode, i.e., an HEV driving mode. When the HEV driving mode is established, the power-source control portion 92 causes the vehicle 10 to perform an engine running, i.e., a hybrid running (=HEV running) with the K0 clutch 20 being engaged and with at least the engine 12 serving as the power source SP. Further, even when the requested drive torque Trdem can be covered by only the output of the electric motor MG, the power-source control portion 92 establishes the HEV driving mode, for example, in a case in the battery 54 needs to be charged or in a case in which the engine 12 or other component needs to be warmed up.

The power-source control portion 92 determines whether the starting of the engine 12 is requested or not, namely, whether the engine 12 is requested to be switched from its stopped state to its driven state. This determination is made, for example, depending on (i) whether the requested drive torque Trdem has been made larger than a range that can be covered by only the output of the electric motor MG in the BEV driving mode, (ii) whether the engine 12 or other component needs to be warmed up in the BEV driving mode, or (iii) whether the battery 54 needs to be charged in the BEV driving mode.

The clutch control portion 94 controls the K0 clutch 20 for executing an engine start control for starting the engine 12. For example, when it is determined by the power-source control portion 92 that the starting of the engine 12 is requested, the clutch control portion 94 outputs a K0 hydraulic-pressure control command signal Sk0 that is supplied to the hydraulic control unit 56, wherein the K0 hydraulic-pressure control command signal Sk0 requests switching of the K0 clutch 20 from the released state to the engaged state for obtaining the K0 torque Tk0 by which a required torque is transmitted toward the engine 12, and wherein the required torque is a torque required to increase the engine rotational speed Ne and to crank the engine 12. In the following description of the present embodiment, the torque required to crank the engine 12 will be referred to as "required cranking torque Tcrn".

When determining that the starting of the engine 12 is requested, the power-source control portion 92 is configured, upon switching of the K0 clutch 20 to the engaged state, to supply, to the inverter 52, the MG control command signal Sm requesting the electric motor MG to output the required cranking torque Tcrn. Further, when determining that the starting of the engine 12 is requested, the power-source control portion 92 is configured to supply, to the engine control device 50, the engine control command signal Se requesting fuel supply to the engine 12 and ignition of the engine 12, in conjunction with cranking of the engine 12 made by the K0 clutch 20 and the electric motor MG The engine control portion 92a is configured to supply, to the engine control device 50, the engine control command signal Se requesting the engine 12 to output the engine torque Te such that the engine 12 is placed in a complete explosion state, i.e., in a state in which self-rotation of the engine 12 is stabilized by explosion of the engine 12, after an initial combustion in which the ignition of the engine 12 is initiated. That is, upon the starting of the engine 12, the engine control portion 92a causes the engine torque Te to be increased.

When the engine 12 is cranked, a reaction force is generated as a result of engagement of the K0 clutch 20. This reaction force causes feeling of deceleration of the vehicle 10, namely, drop of a drive torque Tr due to inertia during the starting of the engine 12. Therefore, when the engine 12 is to be started, the MG torque Tm is increased by the required cranking torque Tcrn which cancels the reaction force. The required cranking torque Tcrn, which is the K0 torque Tk0 required for cranking the engine 12, is to be transmitted from the electric motor MG to the engine 12 through the K0 clutch 20. The required cranking torque Tcrn is, for example, a certain cranking torque Tcr that is predetermined based on, for example, specifications of the engine 12 and a method of starting the engine 12.

The power-source control portion 92 determines whether the stop of the engine 12 is requested or not, namely, whether the engine 12 is requested to be switched from its driven state to its stopped state. In this determination, an affirmative determination is made in the BEV driving mode, for example, when (i) the requested drive torque Trdem is not larger than the range that can be covered by only the output of the electric motor MG, (ii) the engine 12 or other component do not need to be warmed up, and (iii) the battery 54 is not required to be charged.

When determining that stop of the engine 12 is requested, the power-source control portion 92 supplies, to the engine control device 50, the engine control command signal Se requesting gradual reduction of the engine torque Te. Thereafter, after the K0 clutch 20 is switched to the released state by the clutch control portion 94, the power-source control portion 92 supplies, to the engine control device 50, the engine control command signal Se requesting fuel cut for stopping the fuel supply to the engine 12.

There has been described the starting of the engine 12 that is performed by control operations as described above, for example, in a cranking start in which the starting of the engine 12 requires cranking by the K0 clutch 20. However, the starting of the engine 12 does not necessarily require the cranking. For example, there is a case in which restarting of the engine 12 is requested in process of switching of the operation state of the engine 12 from the driven state into the stopped state. In this case, the cranking by the K0 clutch 20 is not required if the engine 12 can be self-rotated by itself by restarting the fuel supply and igniting the engine 12. The starting of the engine 12 without the cranking will be referred to as "autonomous engine restarting". In this autonomous engine restarting, too, as in the starting with the cranking, the K0 clutch 20 is quickly placed in the engaged state after the complete explosion of the engine 12 in which the engine rotational speed Ne and the engine torque Te have been stabilized.

The clutch control portion 94 causes input and output rotational speeds of the K0 clutch 20 to be quickly synchronized with each other, for example, after receiving a notification of the complete explosion from the engine control portion 92a. That is, when the engine 12 is to be started, the clutch control portion 94 executes a synchronous control for switching the operation state of the K0 clutch 20 from the released state to the engaged state by increasing the K0 torque Tk0 so as to complete the synchronization of the input and output rotational speeds of the K0 clutch 20. In the present embodiment, the synchronous control for the K0 clutch 20 will be referred to as "K0 synchronous control", which is to be executed in the autonomous engine restarting as well as in the engine starting with the cranking. The input rotational speed of the K0 clutch 20 is a rotational speed of the engine connection shaft 34, and is equal to the engine rotational speed Ne. The engine control portion 92a outputs the above-described notification of the complete explosion, for example, when a complete-explosion notification waiting time elapses from a point of time at which the engine rotational speed Ne reaches a predetermined complete-explosion rotational speed of the engine 12. This complete-explosion notification waiting time is a predetermined length of time that is predetermined, for example, in view of emission regulations required for the engine 12.

The transmission control portion 96 determines whether a shifting action is to be executed in the automatic transmission 24, by using, for example, a shifting map that represents a predetermined relationship, and outputs the CB hydraulic control command signal Scb, as needed, which is supplied to the hydraulic control unit 56, for executing the shifting action in the automatic transmission 24. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 24. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

By the way, there is a case in which the starting of the engine 12 and the shift action of the automatic transmission 24 are controlled to be executed by the power-source control portion 92 and the transmission control portion 96, respectively, concurrently with each other. In this case, a shock could occur as a result of interference of the controls with each other, which could be caused depending on a situation. In the case in which the starting of the engine 12 and the shift action of the automatic transmission 24 are executed concurrently with each other, the shock could occur, for example, when a synchronization-completion time point of the K0 clutch 20 in the K0 synchronous control upon the starting of the engine 12 overlaps with an inertia phase period from a start to an end of an inertia phase in process of the shift control for the automatic transmission 24. In the following description of the present embodiment, the synchronization-completion time point of the K0 clutch 20 will be referred to as "K0 synchronization point", and overlap of the K0 synchronization point with the inertia phase period will be referred to as "K0 synchronization overlap". When the K0 synchronization overlap occurs, there is a risk of occurrence of the shock that could be caused by failure of appropriate execution of the K0 synchronous control due to variation or fluctuation of the AT input rotational speed Ni. Further, when the K0 synchronization overlap occurs, the shift control could not be appropriately executed due to variation or fluctuation of an input torque Tin upon the switching of the K0 clutch 20 into the engaged state whereby a risk of occurrence of the shock is caused. It might be possible to avoid occurrence of the K0 synchronization overlap, by delaying the engine starting or the transmission shifting action, for example, based on an estimated K0 synchronization time which is obtained by experimentation or determined by an appropriate design theory, and which is an estimated value of a K0 synchronization time to the K0 synchronization point from start of the cranking by the K0 clutch 20. However, the estimated K0 synchronization time could be deviated from an actual value of the K0 synchronization time, due to variation caused in the experimentation and in the K0 clutch 20 and other components, so that the occurrence of the K0 synchronization overlap could not be avoided and accordingly the risk of occurrence of the shock could not be avoided. Further, when the starting of the engine 12 is made without the cranking of the K0 clutch 20 as in the autonomous engine restarting, the K0 synchronization time from the start of the cranking by the K0 clutch 20 cannot be obtained, so that it is not possible to use the method of delaying the engine starting or the transmission shifting action, namely, it is not possible to avoid the occurrence of the K0 synchronization overlap and the risk of occurrence of the shock. Still further, in the method of delaying the engine starting or the transmission shifting action, it would take a long time to complete the starting of the engine 12 and the shifting action of the transmission 24, thereby causing a risk of reduction of a drivability such as an acceleration responsiveness. Moreover, where the engine starting is delayed in the above-described method, if the K0 clutch 20 is kept in the slipping state for a long time, the electric motor MG is required to output the MG torque Tm that is transmitted toward the engine 12 via the K0 clutch 20 for a long time, and the electric motor MG is caused to generate the electric power by the power of the engine 12 whereby the battery 54 would be charged with an increased frequency and there is a risk of reduction of the fuel economy.

In view of the above-described problems, in the present embodiment, the electronic control apparatus 90 executes a torque limitation for limiting at least one of the K0 torque Tk0 and the engine torque Te, from a point of time at which the occurrence of the K0 synchronization overlap is predicted after starting of the K0 synchronous control. Owing to execution of the torque limitation, the K0 synchronization point can be delayed relative to the inertia phase period, and the variation or fluctuation of the input torque Tin of the automatic transmission 24 upon the switching of the K0 clutch 20 into the engaged state can be suppressed during the inertia phase period. Further, the torque limitation starts to be executed at the point of time at which the occurrence of the K0 synchronization overlap is predicted after starting of the K0 synchronous control, rather than at a point of time at which the starting of the engine 12 and the shifting action of the automatic transmission 24 start to be executed in overlap with each other. Thus, the starting of the engine 12 and the shifting action of the automatic transmission 24 are progressed in overlap with each other without execution of the torque limitation until the occurrence of the K0 synchronization overlap is predicted.

Specifically, the electronic control apparatus 90 further includes an overlapping prediction means in the form of an overlapping-prediction determination portion 98 and a torque limitation means in the form of a torque limitation portion 99, for suppressing occurrence of the shock and also suppressing reduction of the acceleration responsiveness when the starting of the engine 12 and the shifting action of the automatic transmission 24 are executed in overlap with each other.

The overlapping-prediction determination portion 98 is configured, upon the starting of the engine 12, to determine whether the K0 synchronous control is being executed or not, for example, depending on whether the above-described notification of the complete explosion has been outputted from the engine control portion 92a.

When determining that the K0 synchronous control is being executed, the overlapping-prediction determination portion 98 determines whether the occurrence of the K0 synchronization overlap is predicted or not. Specifically, the K0 synchronization overlap is the overlap of the K0 synchronization point with the inertia phase period in the process of the shift control of the automatic transmission 24, as described above. The occurrence of the K0 synchronization overlap can be predicted by knowing the K0 synchronization point and the inertia phase period. The K0 synchronization point, which is used for the prediction of the K0 synchronization overlap, is an estimated synchronization time point of the K0 clutch 20, which is, for example, an estimated length of time required for completion of the synchronization of the K0 clutch 20, namely, estimated seconds from a current point of time until the completion of the synchronization of the K0 clutch 20. In the following description of the present embodiment, the estimated synchronization time point of the K0 clutch 20 will be referred to as "estimated K0 synchronization time point". The estimated K0 synchronization time point can be calculated, for example, based on a rate of increase of the engine rotational speed Ne and variation or change of the MG rotational speed Nm. The rate of increase of the engine rotational speed Ne and the change of the MG rotational speed Nm correspond to a rate of change of a rotational speed difference $\Delta Nk0$ that is a difference between the input and output rotational speeds of the K0 clutch 20. During execution of the K0 synchronous control, the overlapping-prediction determination portion 98 calculates the estimated K0 synchronization time point, based on the rate of change of the rotational speed difference $\Delta Nk0$ of the K0 clutch 20. The estimated K0 synchronization time point is to be calculated after starting of the K0 synchronous control, unlike the estimated K0 synchronization time that is the estimated value of the K0 synchronization time from start of the cranking by the K0 clutch 20 until the K0 synchronization point. Therefore, the estimated K0 synchronization time point can be calculated not only in the engine starting with the cranking but also in the autonomous engine restarting that does not require the cranking by the K0 clutch 20. Meanwhile, the inertia phase period can be calculated based on, for example, a degree of progress of the shift control of the automatic transmission 24. The degree of progress of the shift control is a value corresponding to a time from starting of the shift control. The degree of progress of the shift control can be calculated, for example, based on a rate of the CB hydraulic command value Spcb directed to an engaging engagement device to the CB hydraulic command value Spcb directed to a releasing engagement device, wherein the engaging engagement device is one of the engagement devices CB that is to be engaged in process of the shift control of the automatic transmission 24 while the releasing engagement device is one of the engagement devices CB that is to be released in process of the shift control. The overlapping-prediction determination portion 98 determines whether the occurrence of the K0 synchronization overlap is predicted or not, depending on the estimated K0 synchronization time point estimated based on the rate of change of the rotational speed difference $\Delta Nk0$ of the K0 clutch 20 and the inertia phase period estimated based on the degree of progress of the shift control of the automatic transmission 24.

During the inertia phase period in process of the shift control of the automatic transmission 24, the shock, which is to be caused by the occurrence of the K0 synchronization overlap, is large, for example, in a case in which the K0 synchronization overlap occurs in a vicinity of a start point of the inertia phase or in a vicinity of an end point of the inertia phase, wherein the vicinity of the start point includes the start point and the vicinity of the end point includes the end point. Therefore, the inertia phase period, which is to be used for prediction of the occurrence of the K0 synchronization overlap, may be limited to the vicinity of the start point of the inertia phase and the vicinity of the end point of the inertia phase. That is, the inertia phase period, which is to be used for prediction of the occurrence of the K0 synchronization overlap, includes at least the vicinity of the start point of the inertia phase and the vicinity of the end point of the inertia phase. The vicinity of the start point of the inertia phase is a predetermined period, for example, in which substantially same degree of shock is likely to be caused as at the start point of the inertia phase, by the occurrence of the K0 synchronization overlap. The vicinity of the end point of the inertia phase is a predetermined period, for example, in which substantially same degree of shock is likely to be caused as at the end point of the inertia phase, by the occurrence of the K0 synchronization overlap.

When the overlapping-prediction determination portion 98 determines that the K0 synchronous control is being executed and that the occurrence of the K0 synchronization overlap is predicted, the torque limitation portion 99 executes the torque limitation by which at least one of the K0 torque Tk0 and the engine torque Te is made smaller than when the overlapping-prediction determination portion 98 determines that the occurrence of the K0 synchronization overlap is not predicted. Namely, when it is determined by the overlapping-prediction determination portion 98 that the occurrence of the K0 synchronization overlap is predicted executes at least one of a clutch torque limitation and an engine torque limitation, wherein the clutch torque limitation is to be executed to make the K0 torque Tk0 smaller than when it is determined that the occurrence of the K0 synchronization overlap is not predicted, and the engine torque limitation is to be executed to make the engine torque Te smaller than when it is determined that the occurrence of the K0 synchronization overlap is not predicted. Specifically, a magnitude of the shock, which is to be caused upon the occurrence of the K0 synchronization overlap, varies depending on a kind of the shifting action that is to be subjected to the shift control, namely, depending on between which gear positions the shifting action is executed, depending on whether the shifting action is an shift-up action or a shift-down action, or depending on whether the shifting action is executed during a power ON or a power OFF. Further, the magnitude of the shock, which is to be caused upon the occurrence of the K0 synchronization overlap, varies also depending on a method of starting the engine 12, namely, whether the starting of the engine 12 is the engine starting with the cranking or the autonomous engine restarting. Therefore, it is preferable that a torque limitation value, to which the K0 torque Tk0 or the engine torque Te is to be limited during execution of the torque limitation, is set to a value that is predetermined depending on the magnitude of the shock. Thus, the torque limitation portion 99 calculates a K0 torque limitation value, to which the K0 torque Tk0 is to be limited during execution of the clutch torque limitation, i.e., a K0 torque limitation, depending on the kind of the shifting action that is to be subjected to the shift control and/or the method of starting the engine 12. Further, the torque limitation portion 99 calculates an engine torque limitation value, to which the engine torque Te is to be limited during execution of the engine torque limitation, depending on the kind of the shifting action and/or the method of starting the engine 12. The torque limitation portion 99 supplies, to the clutch control portion 94, a command requesting execution of the K0 torque limitation using the calculated K0 torque limitation value, and/or supplies, to the engine control portion 92a, a command requesting execution of the engine torque limitation using the calculated engine torque limitation value.

The overlapping-prediction determination portion 98 determines whether or not it is predicted that the K0 synchronization overlap does not occur during execution of the torque limitation by the torque limitation portion 99. A situation in which the K0 synchronization overlap does not occur and accordingly the shock is hardly caused, corresponds to, for example, a situation in which the shifting action has been already completed in the automatic transmission 24, namely, the shift control of the automatic transmission 24 has been already terminated, or a situation in which the switching of the K0 clutch 20 into the engaged state has been already completed. From a view point of suppressing reduction of the acceleration responsiveness, it is preferable that the torque limitation is released quickly as soon as it is predicted that the K0 synchronization overlap does not occur, namely, as soon as the above-described situation in which the K0 synchronization overlap does not occur is established. Further, the overlapping-prediction determination portion 98 determines that it is predicted that the K0 synchronization overlap does not occur when the shift control of the automatic transmission 24 has been terminated or when the K0 synchronous control has been terminated.

When the overlapping-prediction determination portion 98 determines that it is predicted that the K0 synchronization overlap does not occur during execution of the torque limitation, the torque limitation portion 99 releases the torque limitation, namely, terminates the torque limitation.

From the view point of suppressing reduction of the acceleration responsiveness, a length of time for which the torque limitation is to be executed may be a predetermined time TMf as a maximum time. Specifically, the torque limitation portion 99 determines whether the predetermined time TMf has elapsed from starting of the torque limitation. When determining that the predetermined time TMf has elapsed from the starting of the torque limitation, the torque limitation portion 99 releases the torque limitation. The predetermined time TMf is a threshold value, for example, which is predetermined for suppressing reduction of the acceleration responsiveness. Thus, the torque limitation portion 99 releases the torque limitation when the predetermined time TMf has elapsed after the starting of the torque limitation.

Figure 2:
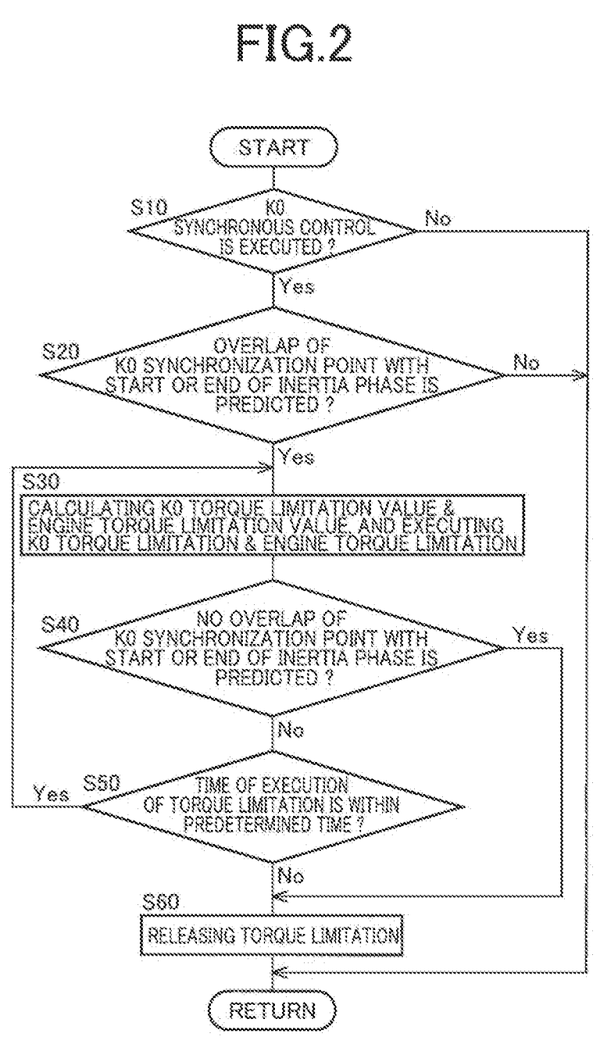
FIG. 2 is a flow chart showing a main part of a control routine executed by an electronic control apparatus, namely, a control routine that is executed for suppressing occurrence of a shock and also suppressing reduction of an acceleration responsiveness when an engine starting and a transmission shifting action are executed in overlap with each other.
Figure 3:
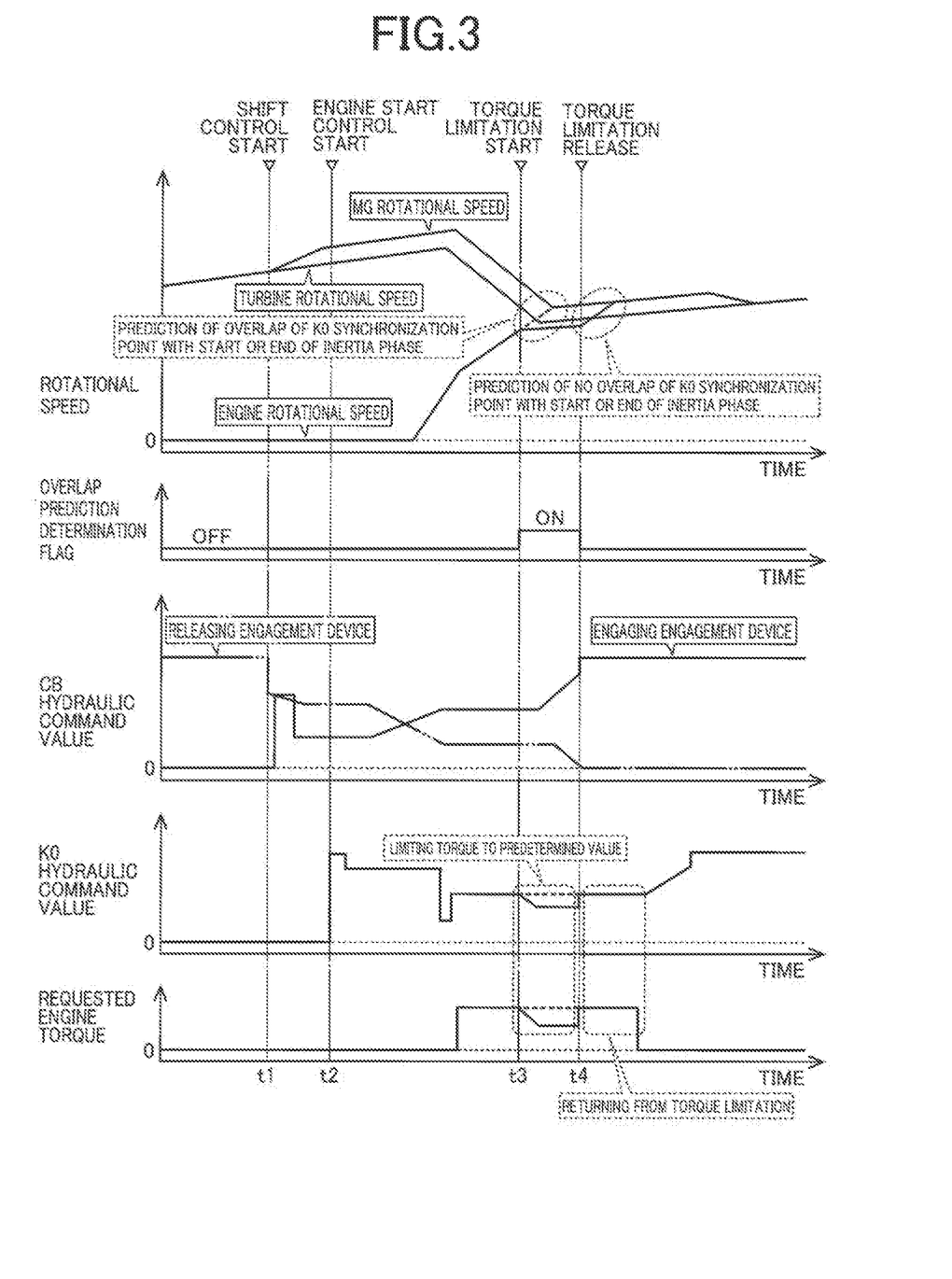
FIG. 3 is a time chart showing, by way of examples, control operations when the control routine shown by the flow chart of FIG. 2 is executed.

FIG. 2 is a flow chart showing a main part of a control routine executed by the electronic control apparatus 90, namely, a control routine that is executed for suppressing occurrence of the shock and also suppressing reduction of the acceleration responsiveness when starting of the engine 12 and a shifting action of the automatic transmission 24 are executed in overlap with each other. This control routine is executed in a repeated manner. FIG. 3 is a time chart showing, by way of examples, control operations when the control routine shown by the flow chart of FIG. 2 is executed. FIG. 3 is a time chart showing, by way of examples, control operations when the control routine shown by the flow chart of FIG. 2 is executed.

As shown in FIG. 2, the control routine is initiated with step S10 corresponding to function of the overlapping-prediction determination portion 98, which is implemented to determine whether the K0 synchronous control is being executed or not, upon the starting of the engine 12. When a negative determination is made at step S10, one cycle of execution of the control routine is terminated. When an affirmative determination is made at step S10, step S20 corresponding to function of the overlapping-prediction determination portion 98 is implemented to determine whether the occurrence of the K0 synchronization overlap is predicted or not, wherein the K0 synchronization overlap means overlap of the K0 synchronization point with the vicinity of the start point of the inertia phase or the vicinity of the end point of the inertia phase in process of the shift control. When a negative determination is made at step S20, one cycle of execution of the control routine is terminated. When an affirmative determination is made at step S20, step S30 corresponding to function of the torque limitation portion 99 is implemented to calculate the K0 torque limitation value and the engine torque limitation value, and to execute the K0 torque limitation and the engine torque limitation. Step S30 is followed by step S40 corresponding to function of the overlapping-prediction determination portion 98, which is implemented to determine whether it is predicted that the K0 synchronization overlap does not occur. When a negative determination is made at step S40, step S50 corresponding to function of the torque limitation portion 99 is implemented to determine whether the time of execution of the torque limitation is within the predetermined time TMf. When an affirmative determination is made at step S50, the control flow goes back to step S30. When an affirmative determination is made at step S40 or when a negative determination is made at step S50, the control flow goes to step S60 corresponding to function of the torque limitation portion 99, which is implemented to release the torque limitation.

FIG. 3 shows, by way of example, a case in which the starting of the engine 12 and a shifting action of the automatic transmission 24 are executed in overlap with each other. In FIG. 3, a time point t1 indicates a point of time at which the shift control of the automatic transmission 24, i.e., the shifting action subjected to the shift control is started. With the shift control being started to be executed, the CB hydraulic command value Spcb is outputted to each of the releasing engagement device and the engaging engagement device (see the time point t1 and thereafter). A time point t2 indicates a point of time at which the engine start control for starting the engine 12 is started. With the engine start control being started to be executed, the K0 hydraulic command value Spk0 is outputted for executing the cranking and the K0 synchronous control (see the time point t2 and thereafter). Although the shift control and the engine start control are executed in overlap with each other after the time point t2, a control, by which one of the shift control and the engine start control is delayed relative to the other, is not executed at the time point t2 in the present embodiment. While the shift control and the engine start control are being progressed without delaying any one of the shift control and the engine start control, an overlap prediction determination flag is ON, upon determination that the occurrence of the K0 synchronization overlap is predicted, and the K0 torque limitation and the engine torque limitation are started (see a time point t3) whereby the K0 torque Tk0 and the engine torque Te are limited to respective predetermined values in the form of the K0 torque limitation value and the engine torque limitation value, respectively. When the torque limitation is started, each of the K0 torque Tk0 and the engine torque Te may be gradually reduced to the torque limitation value from a value before the starting of the torque limitation, so as to avoid abrupt change of the torque, as shown in FIG. 3. In the example shown in FIG. 3, the K0 synchronization overlap, whose occurrence is predicted, is overlap of the K0 synchronization point with the vicinity of the end point of the inertia phase in process of the shift control. When the shift control of the automatic transmission 24 is terminated during execution of the torque limitation and it is determined that it is predicted that the K0 synchronization overlap does not occur, the overlap prediction determination flag is OFF so that the torque limitation is released (see a time point t4) whereby each of the K0 torque Tk0 and the engine torque Te is returned from the torque limitation. When the torque limitation is released, each of the K0 torque Tk0 and the engine torque Te may be gradually increased from the torque limitation value to a value after release the torque limitation, so as to avoid abrupt change of the torque. It is noted that, in FIG. 3, "REQUESTED ENGINE TORQUE" corresponds to the engine control command signal Se requesting output of the engine torque Te, for example, such that the engine 12 is placed in the complete explosion state after the initial combustion.

As described above, in the present embodiment, when the overlapping-prediction determination portion 98 determines that it is predicted that the K0 synchronization point of the K0 clutch 20 overlaps with the inertia phase period, during execution of the K0 synchronous control upon the starting of the engine 12, the torque limitation portion 99 executes the torque limitation by which at least one of the K0 torque Tk0 and the engine torque Te is made smaller than when the overlapping-prediction determination portion 98 determines that it is not predicted that the K0 synchronization point overlaps with the inertia phase period. Owing to this arrangement, it is possible to delay the K0 synchronization point of the K0 clutch 20 relative to the inertia phase period in the shift control of the automatic transmission 24 and to suppress fluctuation of the input torque Tin of the automatic transmission 24 upon switching of the K0 clutch 20 to the engaged state in the inertia phase period. Further, the determination as to whether or not it is predicted that the K0 synchronization point of the K0 clutch 20 overlaps with the inertia phase period is made shortly before the K0 synchronization point, so that it is possible to reduce a time required to complete the starting of the engine 12 and a shifting action of the automatic transmission 24, as compared with an arrangement in which the starting of the engine 12 is delayed as soon as the starting of the engine 12 and the shifting action of the automatic transmission 24 start to be executed in overlap with each other. Further, when it is determined that it is predicted that the K0 synchronization point of the K0 clutch 20 does not overlap with the inertia phase period in a situation in which the shock is hardly caused, the starting of the engine 12 and the shifting action of the automatic transmission 24 are executed in overlap with each other without the torque limitation being executed. Therefore, it is possible to suppress occurrence of the shock and also suppressing reduction of the acceleration responsiveness when the starting of the engine 12 and the shifting action of the automatic transmission 24 are executed in overlap with each other. Further, the reduction of the fuel economy can suppressed.

In the present embodiment, when the overlapping-prediction determination portion 98 determines that it is predicted that the K0 synchronization point does not overlap with the inertia phase period, the torque limitation portion 99 releases the torque limitation. Therefore, in the situation in which the shock is hardly caused, each of the K0 torque Tk0 and the engine torque Te is quickly returned to a normal value whereby the reduction of the acceleration responsiveness can be appropriately suppressed.

In the present embodiment, the overlapping-prediction determination portion 98 determines that it is predicted that the K0 synchronization point does not overlap with the inertia phase period, when the shift control of the automatic transmission 24 is terminated or when the K0 synchronous control is terminated. Thus, the torque limitation is appropriately released.

In the present embodiment, the torque limitation value as the limited value, to which each of the K0 torque Tk0 and the engine torque Te is to be limited in execution of the torque limitation, is determined depending on at least one of the kind of the shift control and the method of starting the engine 12. Therefore, it is possible to appropriately delay the K0 synchronization point of the K0 clutch 20 relative to the inertia phase period and to suppress fluctuation of the input torque Tin of the automatic transmission 24 upon the switching of the K0 clutch 20 to the engaged state in the inertia phase period.

In the present embodiment, the torque limitation portion 99 is configured to release the torque limitation, when the predetermined time TMf, which is predetermined for suppressing reduction of the acceleration responsiveness, elapses from the starting of the torque limitation. Thus, the reduction of the acceleration responsiveness can be appropriately suppressed.

In the present embodiment, the inertia phase period, which is to be used for the prediction as to whether the K0 synchronization point of the K0 clutch 20 overlaps with the inertia phase period, includes at least the vicinity of the start point and the vicinity of the end point of the inertia phase, such that the vicinity of the start point of the inertia phase includes the start point of the inertia phase, and the vicinity of the end point of the inertia phase includes the end point of the inertia phase. Thus, when it is determined that it is predicted that K0 synchronization point of the K0 clutch 20 overlaps with the inertia phase period, it is possible to delay the K0 synchronization point relative to a period in which the shock is likely to be caused by overlap of the K0 synchronization point, and to suppress fluctuation of the input torque Tin of the automatic transmission 24 upon the switching of the K0 clutch 20 to the engaged state in the period in which the shock is likely to be caused by overlap of the K0 synchronization point.

In the present embodiment, the overlapping-prediction determination portion 98 determines whether or not it is predicted that the K0 synchronization point overlaps with the inertia phase period, depending on (i) the estimated K0 synchronization time point estimated based on the rate of change of the rotational speed difference ΔNk0 of the K0 clutch 20 and (ii) the inertia phase period estimated based on the degree of progress of the shift control of the automatic transmission 24. This arrangement makes it possible to appropriately make the determination as to whether or not it is predicted that the K0 synchronization point overlaps with the inertia phase period, shortly before the K0 synchronization point, whereby the period of execution of the torque limitation can be reduced.

While the preferred embodiment of this invention has been described in detail by reference to the drawings, it is to be understood that the invention may be otherwise embodied.

In the above-described embodiment, the automatic transmission 24 is an automatic transmission of a planetary gear type, by way of example. However, the automatic transmission 24 may be any one of other type transmissions such as a synchronous mesh twin shaft parallel axis-type automatic transmission including a known DCT (Dual Clutch Transmission). That is, the present invention is applicable to any vehicle provided with a power source including an engine and an electric motor, a clutch provided between the engine and the electric motor, and a transmission configured to transmit an output torque of the power source to drive wheels.

In the above-described embodiment, the fluid transmission device in the form of the torque converter 22 is provided in the power transmission apparatus 16. However, the provision of the torque converter 22 is not essential. For example, the fluid transmission device may be constituted by, in place of the torque converter 22, by another fluid transmission device such as a fluid coupling device without a function of torque boost effect. Moreover, the fluid transmission device does not necessarily have to be provided but may be replaced by a starting clutch, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
20: K0 clutch (clutch)
24: automatic transmission (transmission)
90: electronic control apparatus (control apparatus)
92a: engine control portion
94: clutch control portion
96: transmission control portion
98: overlapping-prediction determination portion
99: torque limitation portion
MG: electric motor

What is claimed is:

1. A control apparatus for a vehicle that includes: (a) an engine; (b) drive wheels; (c) an electric motor connected, in a power transmittable manner, to a power transmission path between the engine and the drive wheels; (d) a clutch provided between the engine and the electric motor in the power transmission path; and (e) a transmission provided between the electric motor and the drive wheels, the control apparatus comprising:

a clutch control portion configured, upon starting of the engine, to execute a synchronous control for switching an operation state of the clutch from a released state to an engaged state, by increasing a torque capacity of the clutch such that synchronization of an input rotational speed and an output rotational speed of the clutch is completed;

an engine control portion configured, upon the starting of the engine, to increase an output torque of the engine;

a transmission control portion configured to execute a shift control of the transmission;

an overlapping-prediction determination portion configured to determine whether or not it is predicted that, during execution of the synchronous control, a synchronization-completion time point of the clutch overlaps with an inertia phase period from a start to an end of an inertia phase in process of the shift control; and a torque limitation portion configured, when the overlapping-prediction determination portion determines that it is predicted that the synchronization-completion time point overlaps with the inertia phase period, to execute a torque limitation by which at least one of the torque capacity of the clutch and the output torque of the engine is made smaller than when the overlapping-prediction determination portion determines that it is not predicted that the synchronization-completion time point overlaps with the inertia phase period.

2. The control apparatus according to claim 1,
wherein the overlapping-prediction determination portion is configured to determine whether or not it is predicted that the synchronization-completion time point does not overlaps with the inertia phase period, during execution of the torque limitation, and
wherein the torque limitation portion is configured to release the torque limitation, when the overlapping-prediction determination portion determines that it is predicted that the synchronization-completion time point does not overlaps with the inertia phase period.

3. The control apparatus according to claim 2,
wherein the overlapping-prediction determination portion is configured to determine that it is predicted that the synchronization-completion time point does not overlaps with the inertia phase period, when the shift control is terminated or when the synchronous control is terminated.

4. The control apparatus according to claim 1,
wherein the torque limitation portion is configured, when executing the torque limitation, to limit each of the at least one of the torque capacity of the clutch and the output torque of the engine, to a limited value that is dependent on at least one of a kind of the shift control and a method of starting the engine.

5. The control apparatus according to claim 1,
wherein the torque limitation portion is configured to release the torque limitation, when a predetermined time, which is predetermined for suppressing reduction of an acceleration responsiveness, elapses from starting of the torque limitation.

6. The control apparatus according to claim 1,
wherein the inertia phase period includes at least a vicinity of a start point of the inertia phase and a vicinity of an end point of the inertia phase, such that the vicinity of the start point of the inertia phase includes the start point of the inertial phase, and the vicinity of the end point of the inertia phase includes the end point of the inertial phase.

7. The control apparatus according to claim 1,
wherein the overlapping-prediction determination portion is configured to determine whether or not it is predicted that the synchronization-completion time point overlaps with the inertia phase period, depending on (i) a synchronization time point of the clutch estimated based on a rate of change of a difference between the input rotational speed and the output rotational speed of the clutch and (ii) the inertia phase period estimated based on a degree of progress of the shift control.

* * * * *